Patented Apr. 1, 1947

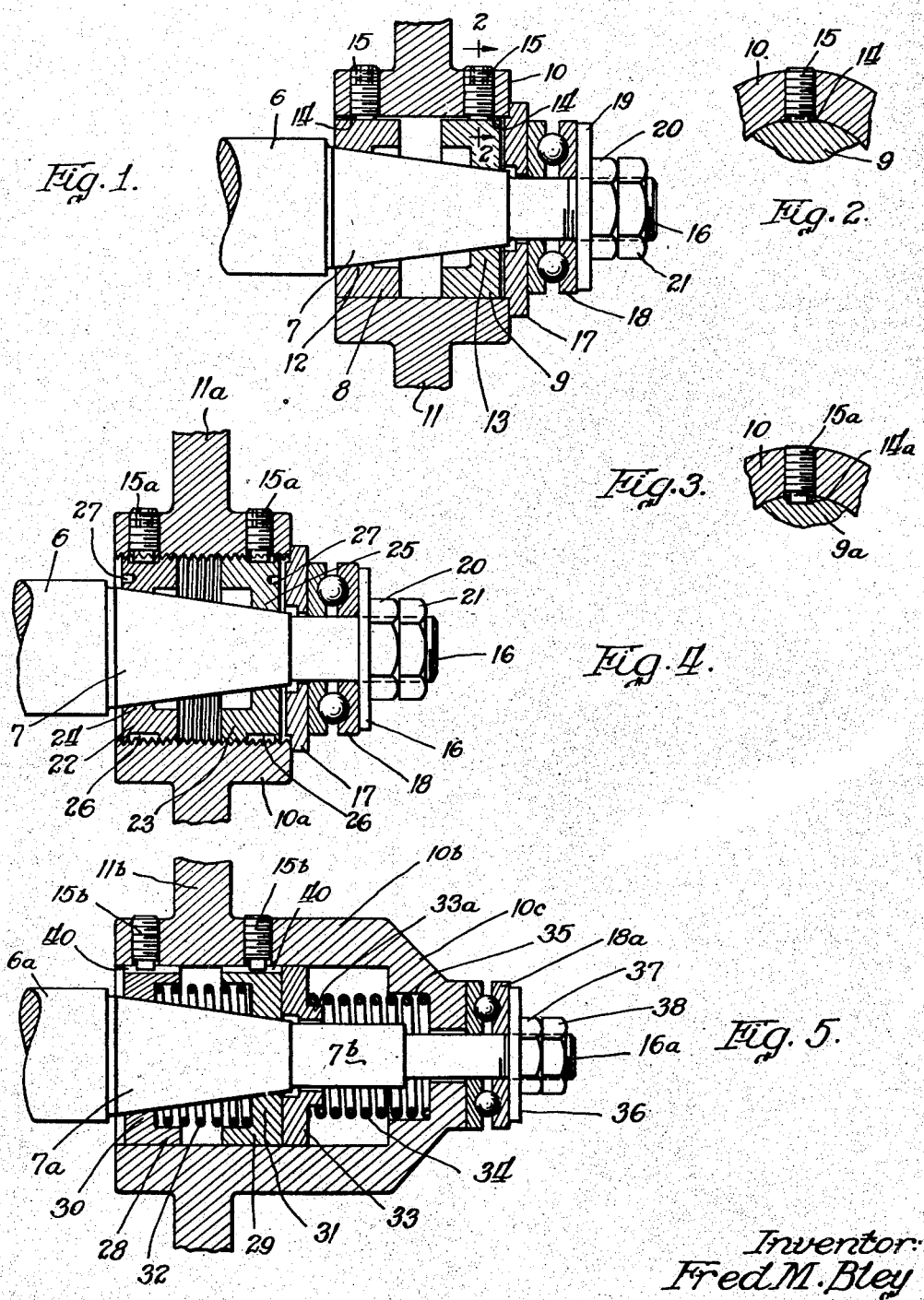

2,418,219

UNITED STATES PATENT OFFICE 2,418,219

BEARING STRUCTURE

Fred M. Bley, Glenview, Ill.

Application June 28, 1945, Serial No. 602,028

9 Claims. (Cl. 308—70)

This invention relates to bearings, and more particularly to tapered bearing structures.

It is of importance in machines intended for precision work that the tool carrying shaft or spindle, for example the spindle of a grinding machine, be accurately centered and restrained against looseness or play such as would render difficult or impossible accurate work with a grinding wheel or other tool carried by such spindle. That is particularly true of high speed machines, in which the tool carrying spindle is driven at high speed, and it is also desirable in such machines that the bearing areas be small, to reduce friction to a minimum. Tapered bearings are extensively used and, if constructed with a high degree of accuracy, give good results. In order properly to support a spindle by a tapered bearing, the tapered bearing portion of the spindle should be of considerable length. It has been found in practice that it is extremely difficult to obtain an accurate fit between two tapered surfaces of considerable length. In an endeavor to avoid that difficulty and to reduce the area of bearing contact, it has been proposed to provide a bearing sleeve of approximately the same length as the tapered bearing surface of the shaft or spindle, this sleeve having at each end a flange provided with a tapered bearing surface intended to fit about the tapered spindle bearing surface. While that reduces the area of bearing contact, it has proven quite difficult to obtain the proper taper of both of the flanges of the sleeve, such as to assure that both thereof will fit snugly and accurately about the tapered spindle bearing surface. Due to that difficulty, in such a bearing one of the flanges of the sleeve will not fit the spindle properly, with the result that the shaft or spindle is not accurately centered and has objectionable play or looseness radially, which precludes the possibility of precision work. While the known tapered bearings referred to are correct in theory it is practically impossible, for the reasons stated, to construct such bearings with a sufficiently high degree of accuracy to assure that a spindle or shaft supported thereby will be retained in centered position and restrained against appreciable looseness or play, which renders such bearings unsuitable for the mounting of a shaft or spindle to be used for precision work.

My invention is directed to a bearing structure which avoids the objections to the known types of bearings above referred to, is of comparatively simple and inexpensive construction, and will support a shaft or spindle in accurately centered position while effectively restraining it against any objectionable looseness or play, whereby a spindle so mounted may be used with assurance for precision work. More specifically, I provide a spindle with a tapered bearing portion of considerable length and rotatably mount this tapered bearing portion of the spindle in two collars fitting snugly within a supporting structure so as to be restrained thereby against any looseness or play. The collars have restricted bearing surfaces of the same taper as that of the bearing portion of the spindle and are in bearing contact therewith, being independently adjustable so that the bearing surface of each thereof may be brought into accurate bearing contact with an end portion of the tapered surface of the bearing portion of the spindle. The adjustment of the bearing collars may be accomplished by sliding the latter in proper direction within the supporting sleeve or structure, by threading the collars in the supporting sleeve therefor, or in other suitable manner. I also provide, in one form of my invention, means for yieldingly urging the collars along the tapered bearing portion of the spindle oppositely to the direction of taper thereof, thereby providing an automatic takeup to compensate for slight wear and assuring that the collars will be maintained in snug bearing contact with the spindle at all times. Further objects and advantages of my invention will appear from the detail description.

In the drawings:

Figure 1 is an axial sectional view of a bearing structure embodying my invention, certain parts being shown in elevation;

Figure 2 is a fragmentary sectional view taken substantially on line 2—2 of Figure 1;

Figure 3 is a view similar to Figure 2 showing a modified form of bearing collar;

Figure 4 is an axial sectional view of a modified form of bearing structure embodying my invention, certain parts being shown in elevation; and Figure 5 is an axial sectional view of a second modified form of bearing structure embodying my invention, certain parts being shown in elevation.

I have shown the bearing structure of my invention as applied to a shaft or spindle 6 having a tapered bearing portion 7 of considerable length. The bearing portion 7 of shaft 6 extends through two bearing collars 8 and 9 fitting snugly within a mounting sleeve 10 of a suitable frame or support 11, shown fragmentarily. Collar 8 is provided with a circumferential flange 12 extending radially inward thereof, the inner face of which flange has the same taper as bearing portion 7 of shaft 6 and fits snugly thereabout in bearing contact therewith adjacent the end of portion 7 of greater diameter. Collar 9 is provided with a circumferential flange 13 extending radially inward therefrom and having its inner surface of the same taper as bearing portion 7 of shaft 6 and fitting snugly thereabout in bearing contact therewith adjacent the end of portion 7 of lesser diameter. Each of the collars 8 and 9 is of materially greater width or axial extent than its bearing flange and fits snugly the interior of sleeve 10, so as to be held thereby against any looseness or play, which eliminates possibility of tilting of either of the collars. Also, each of the collars preferably is provided with a flat 14 with which contacts the inner flat end of a dog-pointed socketed head set screw 15 threaded through sleeve 10. The set screw secures the collar tightly in sleeve 10, restraining it against relative movement lengthwise of the sleeve, and further assures that the collar does not have any looseness or play in the sleeve.

Shaft 6 is further provided with a reduced stud 16 extending outward from bearing portion 7, this stud passing through a thrust disk 17 abutting the corresponding end of sleeve 10, an end thrust ball bearing unit 18 of known type, and a washer 19, between which and thrust sleeve 17 the bearing unit 18 is confined. An adjusting nut 20 and a jam nut 21, threaded on the outer end portion of stud 16, provide means for restraining shaft 6 against lengthwise movement in a direction opposite to the taper of bearing portion 7 thereof.

It will be seen that the flanges 12 and 13 of collars 8 and 9, respectively, have bearing contact with portion 7 of shaft 6 at areas spaced a considerable distance apart lengthwise thereof so as to provide a substantial support for the shaft. The bearing surfaces of flanges 12 and 13 are accurately formed to the same taper as bearing portion 7 of shaft 6 and the collars 8 and 9, being separate from each other, may be adjusted independently lengthwise of sleeve 10 so as to assure accurate fit between the bearing surface of the flange of the respective collars and the corresponding area of tapered bearing portion 7 of shaft 6. In that manner I assure that the shaft or spindle 6 is accurately centered in the bearing collars 8 and 9 and is effectively restrained against any radial looseness or play such as would interfere with accuracy or precision of work done by a grinding wheel or other tool supported on shaft 6 which, it is understood, may be driven in any suitable manner at high speed. It is to be understood that the shaft or spindle 6 may be mounted for rotation at one end only, as in Figure 1, or may be mounted at both ends by means of the bearing structure of my invention, or at one end and at an intermediate point, as desired. If the shaft or spindle 6 be mounted at both ends in the bearing structure of my invention, the bearing structure may be relied upon for restraining the spindle or shaft against lengthwise movement, in which case the stud 16 and associated parts shown for restraining the shaft or spindle 6 against lengthwise movement may be omitted. In any case, it will be understood that any suitable means other than that shown may be provided, for restraining the spindle 6 against lengthwise movement away from the bearing collars 8 and 9. In Figure 3 bearing collar 9ᵃ is shown as provided with a lengthwise groove 14ᵃ, instead of flat 14 shown in Figure 2, which receives the flat ended point of a dog-pointed screw 15ᵃ, it being understood that the bearing collars 8 and 9 of Figure 1 may be secured in adjustment in sleeve 10 in the manner shown in Figure 3 instead of as in Figure 2, if desired.

In the modification shown in Figure 4, sleeve 10ᵃ of the support or frame 11ᵃ is interiorly threaded for reception of two bearing collars 22 and 23 screwing therein. Collar 22 is provided with a circumferential bearing flange 24 of reduced width extending radially inward therefrom, the inner face of which flange is accurately formed to the same taper as the bearing portion 7 of shaft 6 and fits snugly thereabout in bearing contact therewith adjacent the end thereof of greater diameter. Collar 23 is likewise provided with a circumferential bearing flange 25 of reduced width extending radially inward thereof, with its inner face formed accurately to the same taper as bearing portion 7 of shaft or spindle 6 and fitting thereabout in snug bearing contact therewith adjacent the end thereof of lesser diameter. Each of the collars 22 and 23 is provided with a circumferential groove 26 in its outer face, which groove is flat bottomed and receives the flat ended point of a socketed head set screw 15ᵃ threaded through sleeve 10ᵃ. Each of the collars 22 and 23 is also provided, in its outer face, with a plurality of recesses or sockets, one of which is shown at 27, adapted for reception of the studs or pins of a spanner wrench, or other suitable tool, for rotating the collars and thereby adjusting them lengthwise of sleeve 10ᵃ, the grooves 26 being of sufficient width to permit of axial adjustment of either of the collars 22 and 23 to maximum extent in either direction.

In the bearing structure of Figure 4, as in that of Figure 1, the bearing collars 22 and 23 have restricted bearing contact with portion 7 of spindle 6, fit accurately thereabout in bearing contact therewith and support the spindle in centered relation to the collars, while effectively restraining it against axial looseness or play such as would interfere with performing precision work with a grinding wheel or other tool mounted on the spindle 6.

In the modification shown in Figure 5, sleeve 10ᵇ of the support or frame 11ᵇ is of increased length and is provided at its outer end with a cap 10ᶜ. Spindle 6ᵃ is provided with a tapered bearing portion 7ᵃ, a reduced stud 7ᵇ extending from the outer end of portion 7ᵃ, and a reduced stud 16ᵃ extending from the outer end of stud 7ᵇ. Two bearing collars 28 and 29, of substantial width or extend axially, fit snugly within sleeve 10ᵇ in spaced apart relation and are slidable therein. Collar 28 is provided with a circumferential bearing flange 30 extending radially inward thereof and having its inner surface formed accurately to the same taper as portion 7ᵃ of spindle 6ᵃ and fitting snugly thereabout in bearing contact therewith adjacent the end thereof of greater diameter. Likewise, collar 29 is provided with a circumferential flange 31 extending radially inward thereof having its inner surface formed accurately to the same taper as portion 7ᵃ of spindle 6ᵃ and fitting snugly thereabout in bearing contact therewith adjacent the end thereof of lesser diameter.

The collars 28 and 29 are recessed from their inner faces about bearing portion 7ᵃ of spindle 6ᵃ, as are the bearing collars of Figures 1 and 4, for reception of the end portions of a compression coil spring 32 disposed about bearing portion 7ᵃ of spindle 6ᵃ and confined under compression between the collars 28 and 29. A follower disk 33, slidable in sleeve 10$^b$ and disposed about stud 7$^b$ and the outer end of bearing portion 7$^a$ of spindle 6$^a$, with clearance between such members as shown, seats against the outer face of bearing collar 29 and is urged toward the latter by a compression coil spring 34 mounted about stud 7$^b$ and the inner portion of stud 16$^a$. The inner end of spring 35 seats about neck 33$^a$ of disk 33 and the outer end of this spring seats in a recess 35 in cap 10$^c$ of sleeve 10$^b$. Stud 16$^a$ extends through the outer end of cap 10$^c$, a ball bearing unit 18$^a$ seating against the flat outer end of cap 10$^c$, and a washer 36, between which and the cap 10$^c$ the ball bearing unit 18$^a$ is confined. An adjusting nut 37 and a jam nut 38, screwing on to stud 16$^a$, restrain the spindle 6$^a$ against inward movement, that is in a direction opposite to the taper of bearing portion 7$^a$ of spindle 6$^a$, and also provide means for adjusting the spindle 6$^a$ lengthwise in outward direction sufficiently to assure accurate bearing contact of portion 7$^a$ of spindle 6$^a$ with the bearing surfaces of the flanges of the collars 28 and 29. The spring 34 is of appreciably greater effective strength than the spring 32 and urges collar 29 inward along tapered portion 7$^a$ of spindle 6$^a$, spring 32 urging the collar 28 inward along tapered portion 7$^a$, whereby accurate fit of the bearing flanges of the respective collars about the tapered portion 7$^a$ of spindle 6$^a$ is assured. The springs 32 and 34 thus provide means for effecting automatic adjustment of the collars so as to maintain proper bearing contact thereof with tapered bearing portion 7$^a$ of spindle 6$^a$ and to automatically take up any slight wear which may occur, whereby assurance is had that the spindle 6$^a$ is maintained in proper centered relation relative to the collars 28 and 29 and is restrained thereby against any radial looseness or play such as would interfere with the performance of precision work by a grinding wheel or other tool mounted on the spindle 6$^a$. Preferably, although not necessarily, each of the collars 28 and 29 is provided in its outer circumferential surface with an axial groove 40 which receives the point of a dog-pointed screw 15$^a$, such as that shown in Figure 3, the point of the screw fitting snugly in groove 40 and not contacting the collar at the bottom of the groove, it being understood that the screw serves merely to guide the collar in its movement lengthwise of sleeve 10$^b$ and does not in any way restrain the collar against such movement. It will be understood that the means shown for urging the bearing sleeves 28 and 29 inward along the tapered bearing portion 7$^a$ of spindle 6$^a$, in Figure 5, is exemplary only and that any other suitable means may be provided for that purpose within the broader aspects of my invention.

As has been indicated above, and as will be understood by those familiar with this field, changes in construction and arrangement of parts of my invention may be resorted to without departing from the field and scope thereof, and I intend to include all such variations, as fall within the scope of the appended claims, in this application in which the preferred forms only of my invention have been disclosed.

I claim:

1. In a bearing structure of the character described, a mounting sleeve, a spindle having a bearing portion extending through said sleeve presenting two spaced apart adjacent bearing areas tapered in the same direction, and two bearing collars mounted in said sleeve independently adjustable lengthwise thereof having bearing surfaces respectively tapered the same as and in bearing contact with said bearing areas.

2. In a bearing structure of the character described, a mounting sleeve, a spindle having a tapered bearing portion extending through said sleeve, and two bearing collars in said sleeve spaced apart and independently adjustable lengthwise thereof, each of said collars having a bearing surface of the same taper as and in bearing contact with said tapered portion of said spindle.

3. In a bearing structure of the character described, a mounting sleeve, a spindle having a tapered bearing portion extending through said sleeve, two bearing collars in said sleeve spaced apart and independently adjustable lengthwise thereof, each of said collars having a bearing surface of the same taper as and in bearing contact with said tapered portion of said spindle, and individual means for securing said collars in adjustment lengthwise of said sleeve.

4. In a bearing structure of the character described, a mounting sleeve, a spindle having a tapered bearing portion extending through said sleeve, two bearing collars in said sleeve spaced apart and independently adjustable lengthwise thereof, each of said collars having a bearing surface of the same taper as and in bearing contact with said tapered portion of said spindle, and means yieldingly urging said collars along said bearing portion of said spindle in a direction opposite to the direction of taper thereof.

5. In a bearing structure of the character described, a mounting sleeve, a spindle having a tapered bearing portion extending through said sleeve, two bearing collars in said sleeve spaced apart and independently adjustable lengthwise thereof, each of said collars being of considerable extent lengthwise of said sleeve fitting snugly therein and having a relatively narrow circumferential flange extending radially inward with its inner surface of the same taper as and in bearing contact with said tapered portion of said spindle.

6. In a bearing structure of the character described, a mounting sleeve, a spindle having a tapered bearing portion extending through said sleeve, two bearing collars in said sleeve spaced apart and independently adjustable lengthwise thereof, each of said collars being of considerable extent lengthwise of said sleeve fitting snugly therein and having a relatively narrow circumferential flange extending radially inward with its inner surface of the same taper as and in bearing contact with said tapered portion of said spindle, and means yieldingly urging said collars along said bearing portion of said spindle in a direction opposite to the direction of taper thereof.

7. In a bearing structure of the character described, a mounting sleeve, a spindle having a tapered bearing portion extending through said sleeve, two bearing collars in said sleeve spaced apart and independently adjustable lengthwise thereof, each of said collars having a bearing surface of the same taper as and in bearing contact with said tapered portion of said spindle, individual means for securing said collars in adjustment lengthwise of said sleeve, and means restraining said spindle against lengthwise movement through said sleeve oppositely to the direction of taper of said bearing portion of said spindle.

8. In a bearing structure of the character described, a mounting sleeve, a spindle having a tapered bearing portion extending through said sleeve, two bearing collars in said sleeve spaced apart and independently adjustable lengthwise thereof, each of said collars being of considerable extent lengthwise of said sleeve fitting snugly therein and having a relatively narrow circumferential flange extending radially inward with its inner surface of the same taper as and in bearing contact with said tapered portion of said spindle, spring means confined under compression between said collars urging one thereof along said bearing portion of said spindle oppositely to the direction of taper thereof, spring means of greater effective strength than said first spring means urging the other of said collars along said bearing portion of said spindle oppositely to the direction of taper thereof, and means for adjusting said spindle lengthwise through said sleeve in the direction of taper of said bearing portion and restraining it against lengthwise movement in the opposite direction.

9. In a bearing structure of the character described, a mounting sleeve, a spindle having a tapered bearing portion extending through said sleeve, two bearing collars in said sleeve spaced apart and independently adjustable lengthwise thereof, the opposed faces of said collars being recessed about said bearing portion of said spindle and each having a relatively narrow circumferential flange extending radially inward with its inner surface of the same taper as and in bearing contact with said tapered bearing portion of said spindle, a compression spring about said bearing portion of said spindle seating at its ends in the recesses of said collars urging one of said collars along said bearing portion oppositely to the taper thereof, a second compression spring of greater effective strength than said first spring urging the other collar in the same direction as said one collar, and means for adjusting said spindle lengthwise through said sleeve in the direction of taper of said bearing portion and restraining it against movement in the opposite direction.

FRED M. BLEY.

REFERENCES CITED

The following references are of record in the file of this patent:

UNITED STATES PATENTS

| Number | Name | Date |
| --- | --- | --- |
| 2,164,129 | Turrettini | June 27, 1939 |
| 525,775 | Wainwright | Sept. 11, 1894 |